(12) United States Patent
Nakashima

(10) Patent No.: US 6,735,001 B2
(45) Date of Patent: May 11, 2004

(54) IMAGE DISPLAY APPARATUS

(75) Inventor: Fuminori Nakashima, Mie-pref. (JP)

(73) Assignee: Denso Corporation, Kariya (JP)

( * ) Notice: Subject to any disclaimer, the term of this patent is extended or adjusted under 35 U.S.C. 154(b) by 22 days.

(21) Appl. No.: 09/911,427

(22) Filed: Jul. 25, 2001

(65) Prior Publication Data

US 2002/0015197 A1 Feb. 7, 2002

(30) Foreign Application Priority Data

Jul. 27, 2000 (JP) .......................................... 2000-227491
Jun. 5, 2001 (JP) .......................................... 2001-169981

(51) Int. Cl.[7] .............................................. G02B 5/32
(52) U.S. Cl. ............................... 359/15; 359/1; 359/33; 359/453; 359/454; 359/349; 359/9
(58) Field of Search .............................. 359/1, 15, 22, 359/33, 576, 453, 456, 460, 493, 494; 345/204; 349/5, 9

(56) References Cited

U.S. PATENT DOCUMENTS 6,111,670 A    8/2000    Hattori et al.
6,160,663 A  * 12/2000   Merrill et al. ............... 359/500
6,288,803 B1 *  9/2001   Hattori et al. ................ 359/15
2002/0171637 A1 * 11/2002 Kodowaki et al. .......... 345/204

FOREIGN PATENT DOCUMENTS

JP          A-11-102153        4/1999

* cited by examiner

Primary Examiner—Drew Dunn
Assistant Examiner—Fayez Assaf
(74) Attorney, Agent, or Firm—Posz & Bethards, PLC

(57) ABSTRACT

An image display apparatus comprises a hologram screen 2 formed by bonding a hologram element 20 to light-transmissible films 21 and an illumination device 11 for irradiating image light 10 onto the hologram screen and reproducing an image on the hologram screen 2. The light-transmissible film 21 positioned on the irradiation side of the image light 10 relative to the hologram element 20 has an angle deviation of not greater than 45 degrees between a direction of the light-transmissible film 21 that gives the highest thermal shrinkage ratio and an axial direction in the hologram screen 2. Therefore, the image display apparatus can provide high-quality images without the superposition of an interference pattern on the images on the hologram screen.

28 Claims, 8 Drawing Sheets

IMAGE DISPLAY APPARATUS

BACKGROUND OF THE INVENTION

1. Field of the Invention

This invention relates to an image display apparatus that utilizes a hologram element.

2. Description of the Related Art

An image display apparatus, that irradiates image light from various liquid projectors to a hologram screen formed by bonding a hologram element to light-transmissible films, reproduces images on the screen and offers the images to observers, is known.

Figure 3:
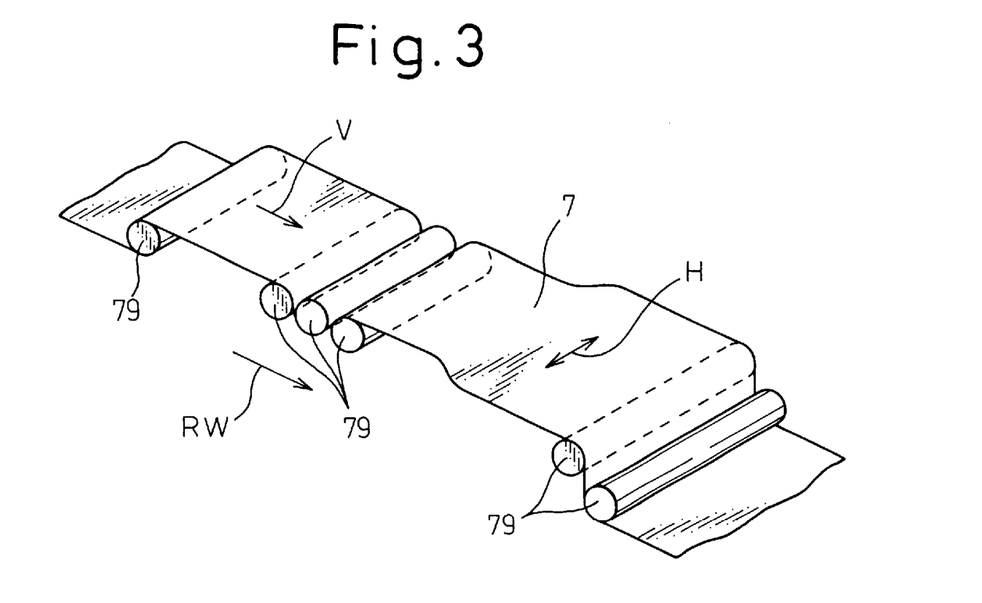
FIG. 3 is an explanatory view of a tensile force of a light-transmissible film during the production thereof in the first embodiment.

Each light-transmissible film described above is pulled in a longitudinal direction V and in a transverse direction H during its production process as shown in FIG. 3 that will be described later in more detail. A symbol RW represents a roll winding direction. This pulling operation orients the molecules of the light-transmissible film and the film becomes an anisotropic material. Therefore, birefringence occurs when rays of light are incident into the light-transmissible film from directions other than a specific direction.

When the rays of light are incident into a material that exhibits birefringence, the rays are divided into normal rays and abnormal rays depending on the direction of a vibration surface of the light, and travel inside the material.

Figure 12:
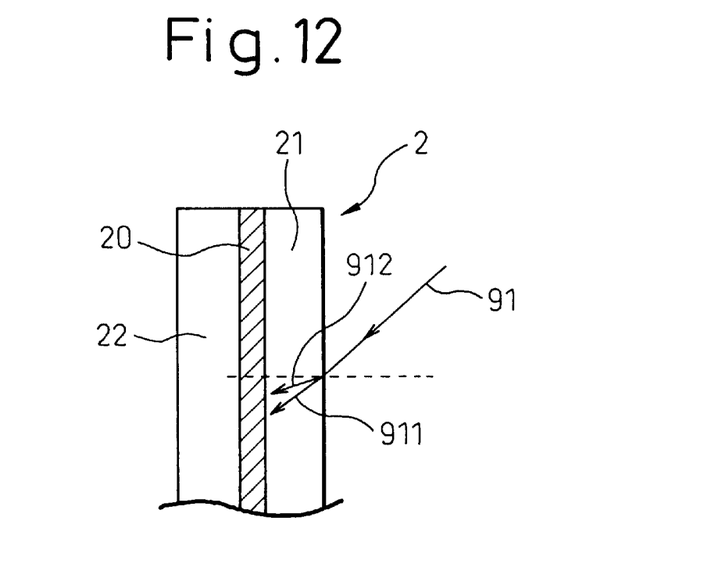
FIG. 12 is an explanatory view of the problems of the prior art.
Figure 13:
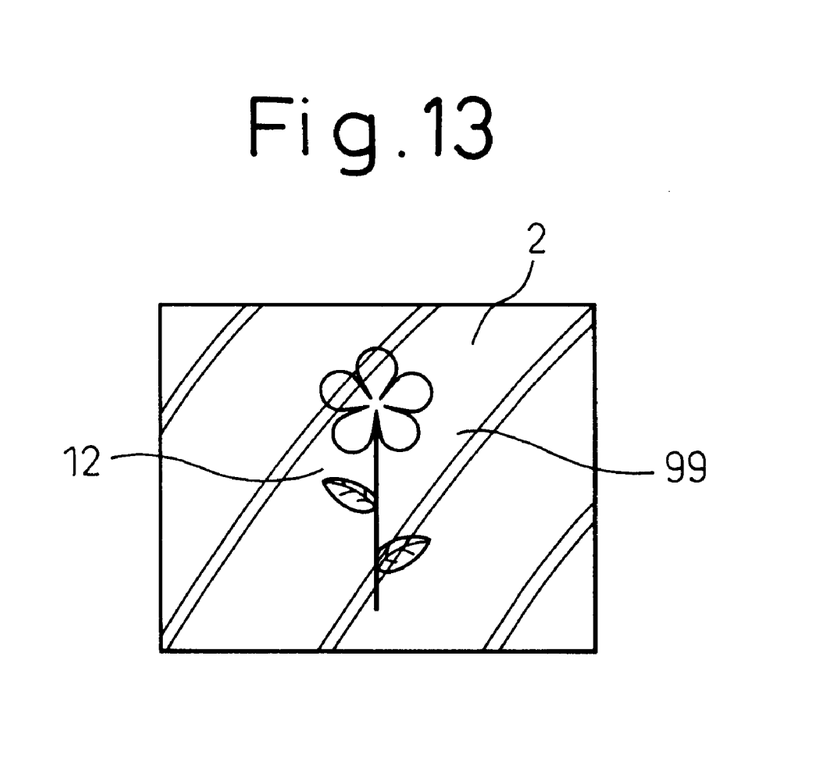
FIG. 13 is an explanatory view of an image and an interference pattern displayed on the hologram screen in the prior art.

Therefore, when image light 91 is irradiated to the hologram screen 2 as shown in FIG. 12, this image light 91 is divided into two rays of light 911 and 912 inside the light-transmissible film 21 that is the anisotropic material, and these rays enter, under such a state as described above, into the hologram element 20. In consequence, these two rays of light 911 and 912 interfere with each other inside the hologram element 20.

Due to this interference, an interference pattern 99 is displayed on the hologram screen 2 in superposition with the image 12 reproduced from the image light 91, so that image quality of the image 12 is greatly deteriorated.

This problem manifests itself particularly in a large-scale hologram screen.

When the rays of light containing a mixture of S polarized light and P polarized light enter into a material that exhibits birefringence, the S polarized light component and the P polarized light component interfere with each other because the refractive index in the material varies depending on the direction of polarization.

Therefore, there develops a problem that, if the rays of light containing the mixture of S polarized light and P polarized light are incident when the image is displayed on the hologram screen 2, the interference pattern appears in superposition with the image 12 on the hologram screen 2. Incidentally, most of recent liquid crystal projectors are of a type that projects a mixture of S polarized light and P polarized light.

SUMMARY OF THE INVENTION

In view of the problems of the prior art described above, the present invention aims at providing an image display apparatus capable of offering high-quality images without superposition of an interference pattern with the images on a hologram screen.

According to the first aspect of the present invention, there is provided an image display apparatus including a hologram screen formed by bonding a hologram element to light-transmissible films and an illumination device for irradiating image light to the hologram screen and reproducing an image on the hologram screen, wherein: the light-transmissible film positioned on the irradiation side of the image light relative to the hologram element has an angle of deviation of not greater than 45 degrees between a direction of the light-transmissible film that gives the highest thermal shrinkage ratio and an axial direction in the hologram screen.

Here, the term "axial direction" is a direction parallel to a segment D obtained by rotating a segment B by 90° along an arc C with G1 as the center when a segment connecting the center G1 of the hologram screen and an irradiation center G2 of the irradiation device is referred to as a segment A, a perpendicular at the center G1 of the hologram screen is referred to as a perpendicular B, and an arc extending from the segment A to the segment B with a fan center at G1 is referred to as the arc C.

It is most noteworthy, in the present invention, that the angle of deviation between a direction of the light-transmissible film on the irradiation side of the image light to the hologram device, which direction gives the highest thermal shrinkage ratio, and the axial direction in the hologram screen is within 45 degrees.

Incidentally, the term "within 45 degrees" represents the angle in either clockwise or counter-clockwise directions.

Next, the operation of the first embodiment of the present invention will be explained.

The light-transmissible film is pulled in both longitudinal and transverse directions during its production process as shown in FIG. 3. This pulling operation orients the molecules of the light-transmissible film, and the film becomes an anisotropic material. The orientation condition of the molecules in the light-transmissible film varies depending on the thickness of the light-transmissible film, its production method, a manufacturing machine, and so forth, but generally has the tendency shown in FIG. 4.

The thermal shrinkage ratio of the light-transmissible film made of the anisotropic material varies depending on direction. The thermal shrinkage ratio is large in the orientation direction of the molecules and is small in directions different from the molecular orientation direction.

When the orientation direction of the molecules is coincident with the axial direction of the hologram screen, the optical axis of the incident image light orthogonally crosses the plane on which a slice plane of a refractive index ellipse of the light-transmissible film describes a circle. Therefore, birefringence does not occur in the same way as in isotropic materials.

The first embodiment stipulates that the angle between the direction of the light-transmissible film giving the highest thermal shrinkage ratio and the axial direction of the hologram screen is not greater than 45 degrees. Therefore, the angle between the orientation direction of the molecules and the axial direction of the hologram screen is also within 45 degrees.

In the hologram screen according to the present invention, therefore, birefringence of the light-transmissible film does not easily occur so that almost no interference pattern occurs. Even when the interference pattern occurs, it is not very noticeable.

In this way, image quality is prevented from being deteriorated by the interference pattern.

When the angle between them is greater than 45°, a noticeable interference pattern is displayed in superposition with the image, and image quality of the image is greatly spoiled.

As described above, the first embodiment can provide an image display apparatus capable of offering high-quality images without superposition of an interference pattern with the image on a hologram screen.

The hologram screen according to the first embodiment can provide the effect described above when the direction of the light-transmissible film on the incidence side of the image light, that gives the highest thermal shrinkage ratio, is aligned with the axial direction of the hologram screen.

When the light-transmissible films are so disposed as to sandwich the hologram element, the direction of both light-transmissible films that gives the highest thermal shrinkage ratio can be aligned with the axial direction of the hologram screen.

In the hologram screen, it is possible to employ a construction in which the light-transmissible film having the direction giving the highest thermal shrinkage ratio and aligned with the axial direction of the hologram screen is disposed on the incidence side of the image light, and a transparent substrate made of a transparent isotropic material such as glass is disposed on the opposite side.

The light-transmissible film may be a colorless transparent film, or a thinly colored transparent film.

Further, a plurality of light-transmissible films may be bonded to the hologram element.

Various plastic films can be used for the light-transmissible film. Besides a PET film, to be later described, it is possible to use TAC (triacetylcellulose), polycarbonate, polyurethane, polystyrene, polyethylene, nylon, vinyl chloride, polypropylene and polyvinyl alcohol.

The hologram element used in the present invention can be produced by the steps of using diffused light through a light diffusion member such as frosted glass as object light and non-diffused light as reference light, projecting both of them to a photosensitive member, and recording an interference fringe functioning as a diffraction grating formed by them on the photosensitive member.

Various devices capable of projecting projection light of still images and dynamic images such as a slide projector, OHP (overhead projector), a projector, a movie projector, and so forth, can be used as the illumination device in the first embodiment.

The illumination device described above has an image supply device inside or outside thereof, and functions as a source of the image light. A reproducing device such as video tapes, various optical disks, etc, and personal computers can be used as the image supply device, and the source of the image light can be supplied from outside through a communication line.

Incidentally, when a rectangular hologram screen is used in the image display apparatus according to the first embodiment, the apparatus is installed in most cases in parallel with the floor or the ground, for example, but may also be disposed slantingly.

When the hologram screen is rectangular or square and the bottom side of the screen is disposed in parallel with the ground surface or the floor, the axial direction described above coincides with the perpendicular direction.

The hologram screen can be installed on a curved glass window, or the like. Beside the wall surface, the hologram screen may also be installed on the ceiling surface or the floor surface.

The hologram screen may have various shapes such as a circle, a trapezoid and a triangle.

According to the second aspect of the present invention, angle deviation between the direction of the light-transmissible film giving the highest thermal shrinkage ratio and the axial direction in the hologram screen is preferably within 15 degrees. When this angle deviation is within 45 degrees, the interference pattern is hardly noticeable as already described. When the angle deviation is within 15 degrees, the occurrence itself of the interference pattern can almost be suppressed.

According to the third aspect of the present invention, the direction of the light-transmissible film giving the highest thermal shrinkage ratio and the axial direction of the hologram screen preferably coincide with each other.

According to this construction, an excellent image display apparatus almost free of the occurrence of an interference pattern can be obtained.

The direction giving the highest thermal shrinkage ratio can be determined by, for example, cutting out, at 5 degree intervals, strips from a hologram screen and comparing the thermal shrinkage ratios of the screen fragments.

Next, according to the fourth aspect of the present invention, there is provided an image display apparatus including a hologram screen formed by bonding a hologram element to light-transmissible films and an illumination device for irradiating image light to the hologram screen and reproducing an image on the hologram screen, wherein light-transmissible film positioned on the irradiation side of the image light relative to the hologram element is so constituted as not to generate birefringence.

The light-transmissible film according to the fourth aspect has an isotropic refractive index, and does not generate birefringence from which direction the rays of light may be incident thereto. Therefore, it becomes possible to acquire an excellent image display apparatus substantially free from the interference pattern irrespective of the bonding angle of the films.

In the fourth aspect described above, the term "light-transmissible film not generating birefringence" means a film in which birefringence does not occur in at least 60% of the screen area.

Even though birefringence does not occur in at least 60% of the area, the interference pattern occurs in remaining less than 40% of the area. However, the quantity of the occurrence of the interference pattern is small, and the image having an image quality sufficient enough to satisfy the requirements of viewers can be obtained.

When the portions in which the interference pattern occurs are less than 40%, an evaluation result can be obtained, in a sensory test, to the effect that the interference pattern portions are not distracting.

Incidentally, the term "light-transmissible film free from occurrence of birefringence" generally represents those films which are commercially available as "films having a high optical grade". Such films are produced so that each part of the film has a uniform refractive index so as not to generate birefringence.

According to the fifth aspect of the present invention, the light-transmissible film preferably comprises a resin film. Since many transparent resin films having high flexibility are available, they are suitable for bonding to the hologram element.

Besides the polyethylene terephthalate film, to be later described in more detail, the resin film can use TAC (triacetylcellulose), polycarbonate, polyurethane, polystyrene, polyethylene, nylon, vinyl chloride, polypropylene, polyvinyl alcohol, or the like.

According to the sixth aspect of the present invention, there is provided an image display apparatus including a hologram screen formed by bonding a hologram element to light-transmissible films and an illumination device for irradiating image light to the hologram screen and reproducing an image on the hologram screen, wherein the light-transmissible film positioned on the irradiation side of the image light relative to the hologram element has a difference of not greater than 0.3% between a direction giving the highest thermal shrinkage ratio and a direction giving the lowest thermal shrinkage ratio.

The light-transmissible film according to the sixth aspect does not have a difference in the thermal shrinkage ratio as a whole and optically functions as an isotropic material as a whole. Therefore, it becomes possible to obtain an image display apparatus free from interference fringes, etc, due to birefringence, and capable of providing high-quality images.

When the difference of the thermal shrinkage ratio is greater than 0.3%, the interference fringe is likely to occur, thereby lowering image quality.

Incidentally, to measure the thermal shrinkage ratio, fragments are cut out from the light-transmissible film at different angles, and the thermal shrinkage ratio of each fragment is examined to determine the thermal shrinkage ratio.

According to the seventh aspect of the present invention, the light-transmissible film positioned on the irradiation side of the image light relative to the hologram element preferably comprises a polyethylene terephthalate film.

The polyethylene terephthalate (hereinafter called "PET") film is excellent in weatherability and transparency, is tough and is therefore suitable for protecting the hologram element.

According to the eighth aspect of the present invention, it is preferred to bond a plurality of hologram elements through the light-transmissible films.

Since the image from the irradiated image light is displayed in each of these hologram elements, the image finally entering the eyes of the observer is the image superposed in the number of the hologram elements.

Therefore, an image that has high brightness and is easy to watch can be obtained.

In this construction, in connection with the irradiating direction of the image light, each hologram element is bonded in such a fashion that the direction of the light-transmissible film giving a large thermal shrinkage ratio is aligned with the axial direction.

According to the ninth aspect of the present invention, it is preferred that at least one chromatic component of the RGB (red, green and blue) components of the image light irradiated from the illumination device is linearly polarized light.

When two linearly polarized lights, the polarization directions of which cross each other, are incident into the light-transmissible film as the anisotropic material, the component of light is completely divided into two components and travels inside the light-transmissible film.

When two or more components in RGB are linearly polarized rays of light the polarization directions of which cross each other, the image is superposed with a rainbow colored interference pattern because the refractive index of light is different depending on the wavelength.

When at least one chromatic component is linearly polarized light as stipulated in the ninth aspect described above, the present invention operates most effectively.

Next, according to the tenth aspect of the present invention, the hologram element preferably has a diagonal length of 104 cm or more.

Incidentally, degradation of image quality resulting from the interference pattern becomes more severe as the size of the hologram element becomes greater.

In a large-scale screen in which the diagonal length of the hologram element exceeds 104 cm, even a slight degradation of the image is magnified and becomes more noticeable. Therefore, the present invention operates effectively.

When the interference patterns occur in a large-scale screen exceeding 152 cm, in particular, image quality drops extremely and the construction of the present invention operates effectively.

Incidentally, the term "diagonal length" represents the length of the diagonal when the hologram screen is rectangular or square.

When the hologram screen has another shape, the present invention exhibits the similar effect when the area of the hologram element coincides with that of a screen having the size described above.

According to the eleventh aspect of the present invention, the hologram element is preferably of a transmission type or a reflection type.

The hologram element is produced from a photosensitive material by use of reference light and object light generated through a light diffusion member. The transmission type element can be produced when object light and reference light are caused to be incident from the same direction. The reflection type element is opposite to the former.

The present invention can be applied to both a transmission type and a reflection type.

According to the twelfth aspect of the present invention, the angle of incidence of the image light to the center of the hologram screen is preferably from 20 to 50 degrees.

In consequence, the image on the hologram screen becomes easier to watch.

When the angle of incidence is less than 20 degrees, the image light is divided into two parts inside the light-transmissible film due to birefringence when it is incident into the hologram screen, and these two parts are more likely to interfere on the hologram element with the result that the interference pattern is more likely to occur.

When the image light is incident at an angle of 50 degrees or more, distortion occurs at the end portions of the image displayed and trapezoidal distortion becomes so strong that the correct image cannot be displayed.

The most preferred angle of incidence is 35 degrees.

Figure 1A:
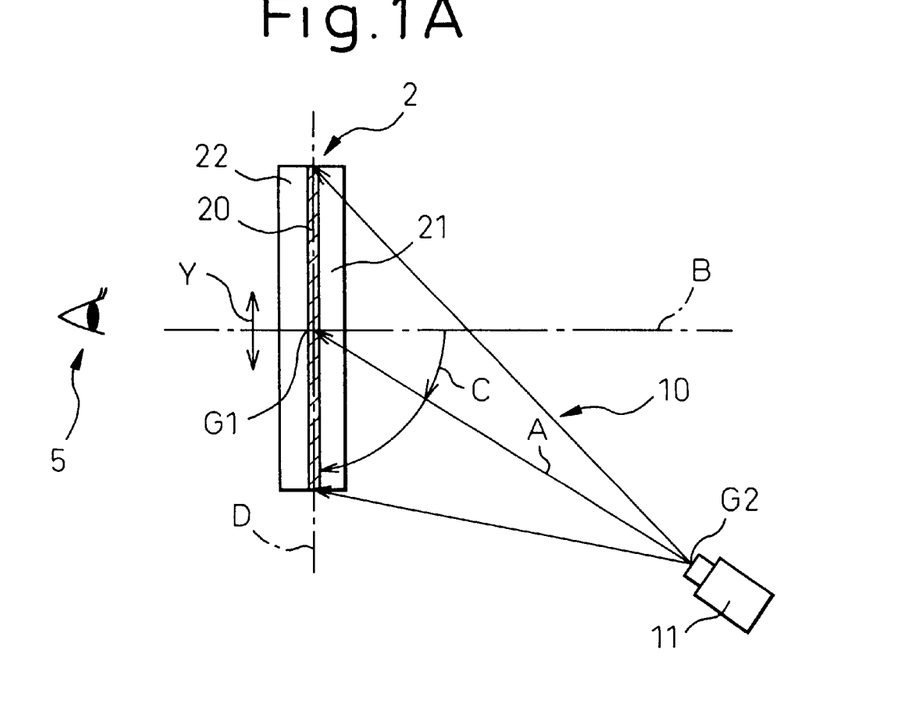
FIG. 1A is an explanatory view of a hologram screen in an axial direction in the first embodiment of the present invention.

The angle of incidence is defined in the following way with reference to the later-appearing FIG. 1. A segment connecting the center G1 of the hologram screen to the irradiation center G2 of the illumination device is referred to as a segment A. A perpendicular at the center G1 of the hologram screen is referred to as a perpendicular B. An arc extending from the segment A to the segment B and having a center at G1 is referred to as an arc C. In this case, the angle of incidence corresponds to the center angle of this arc C.

Next, according to the thirteenth aspect of the present invention, a visible ray transmission factor of the light-transmissible film described above is preferably at least 10%.

In this way, it is possible to exploit the feature of the hologram screen that the image and the background can be simultaneously observed.

When the visible ray transmission factor is less than 10%, the feature described above is likely to be spoiled.

Incidentally, the visible ray transmission factor is determined by attenuation of the intensity of light before and after the incidence of light when the visible rays of light, that is, the rays of light having wavelength of 380 nm to 780 nm, are allowed to be incident into the light-transmissible film.

DESCRIPTION OF THE PREFERRED EMBODIMENTS

Embodiment 1

An image display apparatus according to the first embodiment of the present invention will be explained with reference to FIGS. 1A to 8.

As shown in FIG. 1A, the image display apparatus according to this embodiment includes a hologram screen 2 formed by bonding a hologram element 20 to light-transmissible films 21 and 22, and an illumination device 11 for irradiating image light 10 to the hologram screen 2 and reproducing the image on the hologram screen 2.

In the light-transmissible film 21 positioned on the irradiation side of the image light 10 relative to the hologram device 20, deviation of the angle between the direction giving the highest thermal shrinkage ratio in the light-transmissible film 21 and an axial direction Y in the hologram screen 2 is within 45 degrees.

Incidentally, in FIG. 1A, the term "axial direction" described above indicates a direction parallel to a segment D that is obtained in the following way. A segment A connects the center G1 of the hologram screen and the irradiation center G2 of the irradiation device 11. A perpendicular B is drawn at the center G1 of the hologram screen 2. An arc C having its center at G1 is drawn from the segment A to a perpendicular B. The segment D is then obtained by rotating the segment B by 90 degrees with G1 as the center.

Hereinafter, the image display apparatus 1 of this embodiment will be explained.

Figure 2:
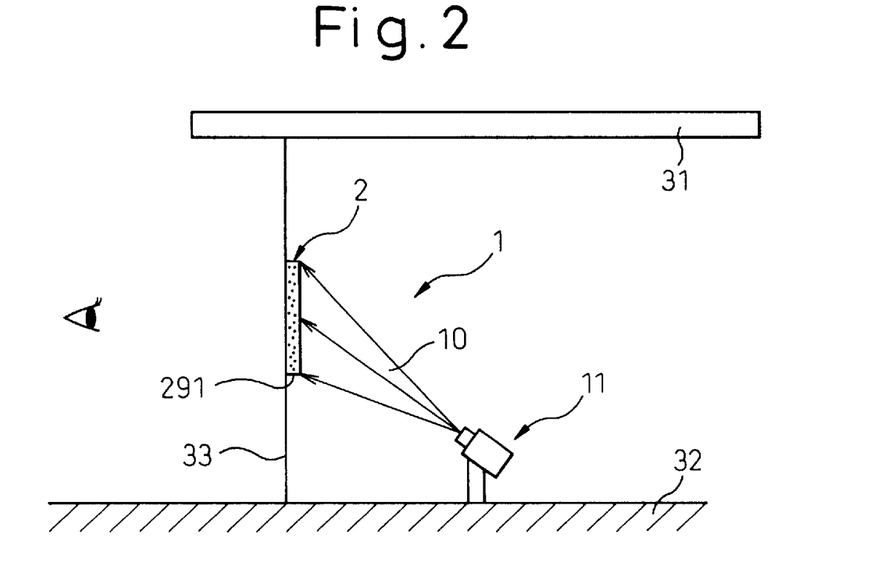
FIG. 2 is an explanatory view of an image display apparatus in the first embodiment.

As shown in FIG. 2, the hologram screen 2 in the image display apparatus 1 of this embodiment is bonded and fixed to window glass 33.

The illumination device 11 described above is a liquid crystal projector, and is fixed to the floor so that the image light 10 can be incident at an angle of incidence of 35 degrees.

Reference numeral 31 denotes a ceiling.

Among the RGB (red, green and blue) components of the image light 10 irradiated from the illumination device 11, R and B components are P polarized light, and the G component is under the mixed state of P polarized light and S polarized light.

Figure 5:
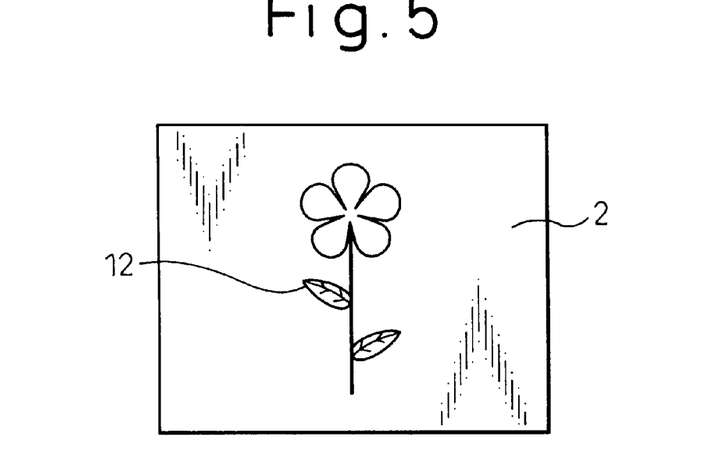
FIG. 5 is an explanatory view of the image displayed on the hologram screen in the first embodiment.

When the image light 10 is incident to the hologram screen 2, the image light 10 is transmitted through the light-transmissible film 21, enters the hologram element 2, and is refracted and scattered by the hologram element 2, so that the image 12 is displayed on the hologram element 2 as shown in FIG. 5. The image so displayed reaches an observer 5 through the light-transmissible film 22 and the window glass 33.

Next, the hologram screen 2 will be explained.

Figure 1B:
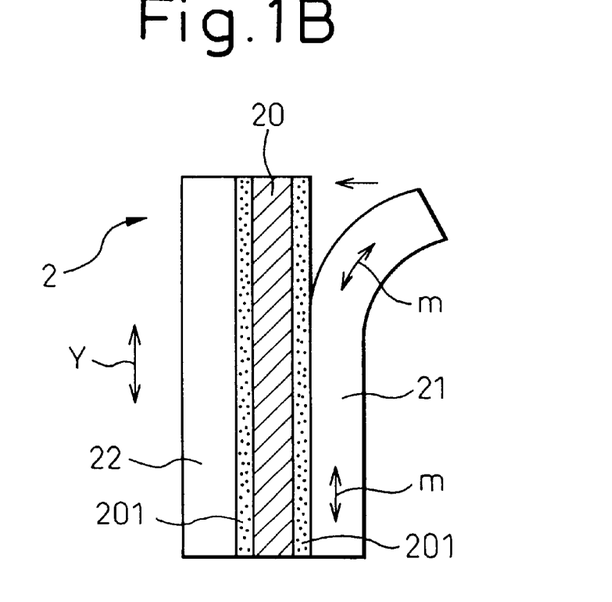
FIG. 1B is an explanatory view of the hologram screen.

The hologram screen 2 comprises a transmission type hologram 20 sandwiched between two light-transmissible films 21 and 22 as shown in FIG. 1B, and a transparent adhesive 201 bonds these members to one another.

The axial direction of the hologram screen 2 in this embodiment is parallel to the segment D shown in FIG. 1A. The hologram screen 2 in this embodiment is planar rectangular screen that is not curved.

The bottom side 291 of the hologram screen 2 is parallel to the floor 32. Therefore, the axial direction in this embodiment is coincident with the longitudinal direction (perpendicular direction).

Figure 4:
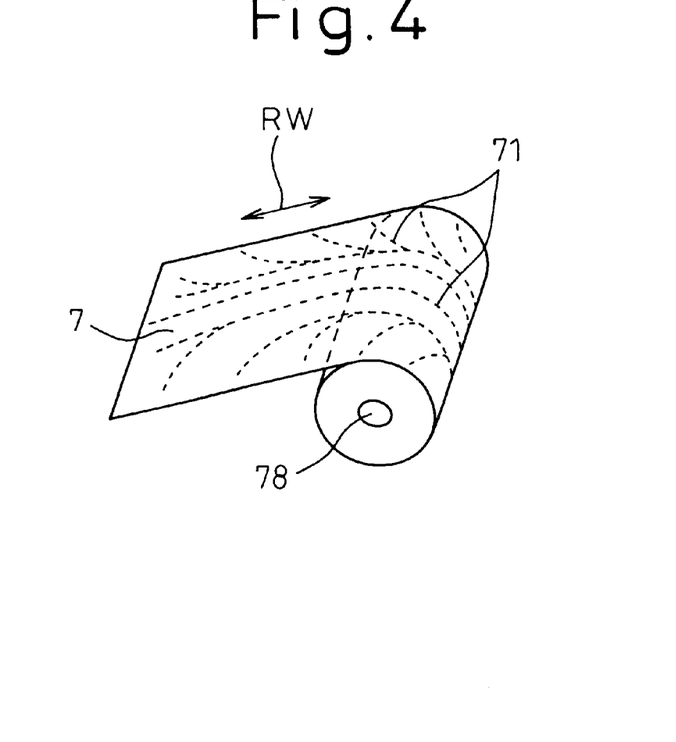
FIG. 4 is an explanatory view of the orientation of molecules in a roll film 7 used as the light-transmissible film in the first embodiment.

The light-transmissible film 21 in this embodiment uses a roll film 7 shown in FIG. 4.

This roll film 7 is a colorless transparent PET film formed by a biaxial stretching method. The roll film 7 is taken up on a core material 78 while being pulled in a longitudinal direction V (winding direction on the core material 78) and in a transverse direction H (perpendicular direction to the winding direction) during production as shown in FIG. 3. As a result, a molecular orientation is created in the light-transmissible film as indicated by dotted line 71 in FIG. 4. This orientation assumes the form in which the center of roll is equal to the roll winding direction RW and both of its ends are branched from the center, respectively.

Incidentally, reference numeral 79 in the drawing denotes a feed roller.

The roll film 7 is cut into a suitable length and into a similar shape as that of the hologram element 20, and is bonded by using an adhesive 201 as shown in FIG. 1B. At this time, the light-transmissible film 21 is bonded in such a fashion that the roll winding direction RW is coincident with the longitudinal direction of the hologram screen 1 as shown in FIG. 4.

This roll film 7 is heated to a suitable temperature and its thermal shrinkage ratio is measured. It is found that the thermal shrinkage ratio is 0.8% in the roll winding direction and is 0.1% in the direction perpendicularly crossing the roll winding direction.

In other words, the light-transmissible film 21 bonded to the hologram element 2 in this embodiment is an anisotropic material, and the longitudinal direction of the hologram screen 2 is coincident with the direction in which the thermal shrinkage ratio is the highest.

It is not particularly necessary to align the roll winding direction with the axial direction of the hologram screen 2 when the light-transmissible film 22 is bonded.

Next, the function and the effect of this embodiment will be explained.

The thermal shrinkage ratio of the light-transmissible film 21 as the anisotropic material varies depending on directions. In this embodiment, the light-transmissible film 21 is bonded to the hologram element 20 in such a fashion that the direction of the light-transmissible film 21 having the highest thermal shrinkage ratio coincides with the axial direction of the hologram screen 2.

Therefore, the optical axis of the image light 10 that is incident into the light-transmissible film 21 crosses the plane in which the slice plane of the refractive index ellipse of the light-transmissible film 21 describes a circle, and the image light 10 does not undergo birefringence inside the light-transmissible film 21.

Therefore, the problem that the refraction pattern resulting from birefringence is superposed with the image 12 and sharpness of the image drops (see FIG. 12) does not occur, and a satisfactory image 12, to watch, can be obtained as shown in FIG. 5.

As described above, this embodiment can provide an image display apparatus free from superposition of the interference pattern with the image on the hologram screen and capable of providing a high-quality image.

Figure 6:
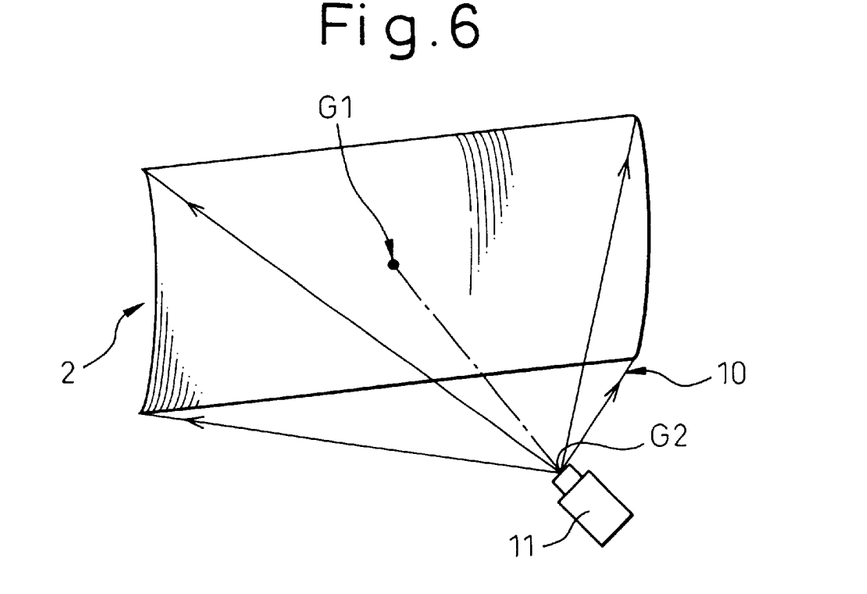
FIG. 6 is an explanatory view of a curved hologram screen in the first embodiment.

Incidentally, the image display apparatus 1 in this embodiment comprises the planar hologram screen 2, but it can use a curved hologram screen 2 as shown in FIG. 6.

Figure 7:
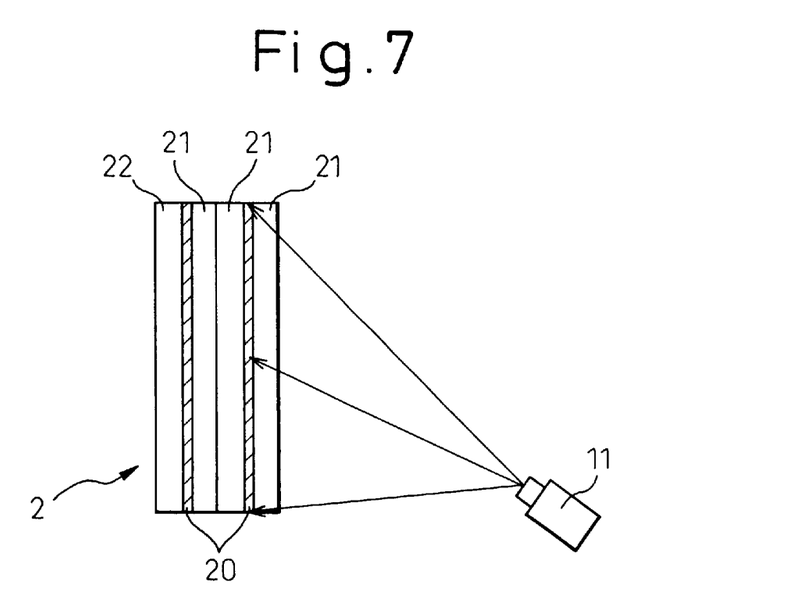
FIG. 7 is an explanatory view of a hologram screen using two hologram elements.

As shown in FIG. 7, this embodiment can also use a hologram screen 2 using two hologram elements 20. This hologram screen 2 is produced as two sets of hologram elements 20, each being sandwiched between two light-transmissible films 21, are laminated.

In this hologram screen 2, the direction in which the thermal shrinkage ratio of each light-transmissible film 21 is the highest is aligned with the axial direction of the hologram screen 2. As to the other light-transmissible film 22, however, the direction giving the highest thermal shrinkage ratio need not be aligned with the axial direction.

Figure 8:
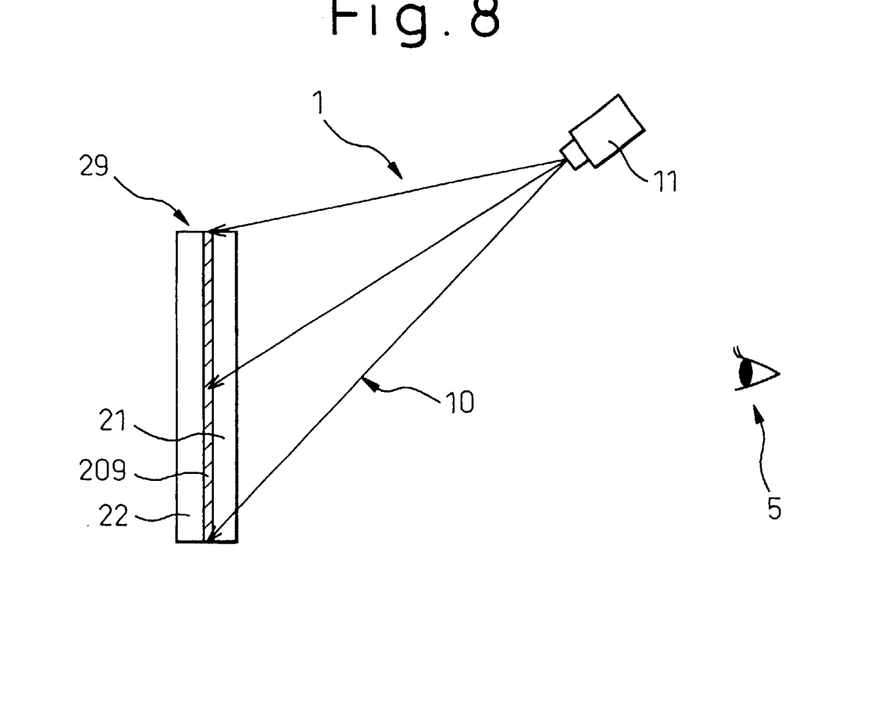
FIG. 8 is an explanatory view of an image display apparatus using a reflection type hologram screen in the first embodiment.

The image display apparatus in this embodiment uses the transmission type hologram element. However, the image display apparatus 1 can be also constituted by use of a reflection type hologram element screen 29 produced by utilizing a reflection type hologram element 209 as shown in FIG. 8.

Embodiment 2

This embodiment explains the bonding angle of the light-transmissible film to the hologram element.

Figure 9:
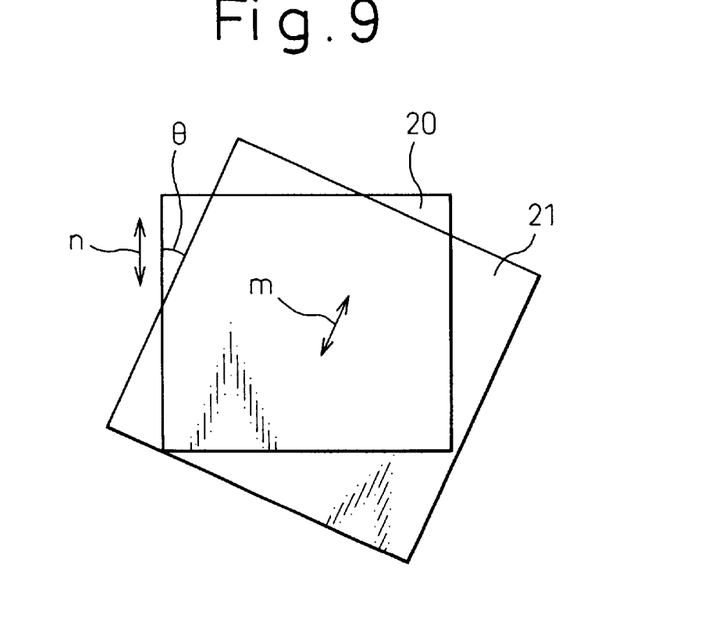
FIG. 9 is an explanatory view of an angle θ between an axial direction of a hologram element and a roll winding direction of a light-transmissible film in the second embodiment.

First, a light-transmissible film 21 cut into a rectangular shape and a hologram element 20 are prepared as shown in FIG. 9. Symbol m represents the roll winding direction of the light-transmissible film, that is, a direction in which the thermal shrinkage ratio is the highest. Symbol n represents an axial direction of the hologram screen. The angle between them is called θ.

The hologram element 20 and the light-transmissible film 21 are bonded to each other while the angle θ is changed from 0 to 180 degrees in 5° units. The image light is irradiated from the illumination device in the same way as in the embodiment 1.

The image is thus displayed on the hologram element 20. This image was observed by a large number of monitors to evaluate image quality.

As a result, it has been confirmed that no interference pattern occurs for any monitor when θ was within the range of 0° to 45° and within the range of 135° to 180°. In other words, when deviation of the angle between the axial direction and the roll winding direction was within 45°, it was confirmed, through the monitors, that image quality was lowered by the interference fringe as θ approached 45° or 180°.

However, none of the monitors gave an evaluation to the effect that the image could not be watched easily and image quality was too low.

Within the range of angle of 46° to 135°, however, the monitors made the evaluation that image quality was too poor and confirmation of the image was difficult because the image was superposed with the interference pattern. Incidentally, FIG. 12 schematically depicts the image condition at time.

Further, the monitors made the evaluation that when θ was 90°, that is, when the axial direction crossed the roll winding direction, the interference pattern occurs densely and overlapped with the image, and image quality was remarkably deteriorated.

As can understood from the results of the experiments described above, it is extremely effective to bring the roll winding direction of the light-transmissible film, that is, the direction in which the thermal shrinkage ratio becomes the highest, into conformity with the axial direction in order to improve image quality. It has also been found that when the direction having the large thermal shrinkage coefficient is somewhat deviated from the axial direction, images having satisfactory quality can be obtained, but the deviation (=θ) must be within 45°.

An experiment was conducted in the same way as described above while deviation (=θ) was kept within 15°. As a result, it was confirmed that image quality was the best when the deviation was 0° but when the angle was kept within 15°, image quality at a similar level can still be obtained.

Embodiment 3

In this embodiment, experiments were conducted about the relation between the size of the hologram screen and image quality.

The light-transmissible film and the hologram element were bonded in such a fashion that the direction giving the highest thermal shrinkage ratio crossed the axial direction (90°) to produce a hologram screen having the construction of the embodiment 1 shown in FIG. 1.

The diagonal length was changed in 5-inch units from 30 inches (=76.2 cm) to 60 inches (=152.4 cm) to change the size of the hologram screen.

Figure 10:
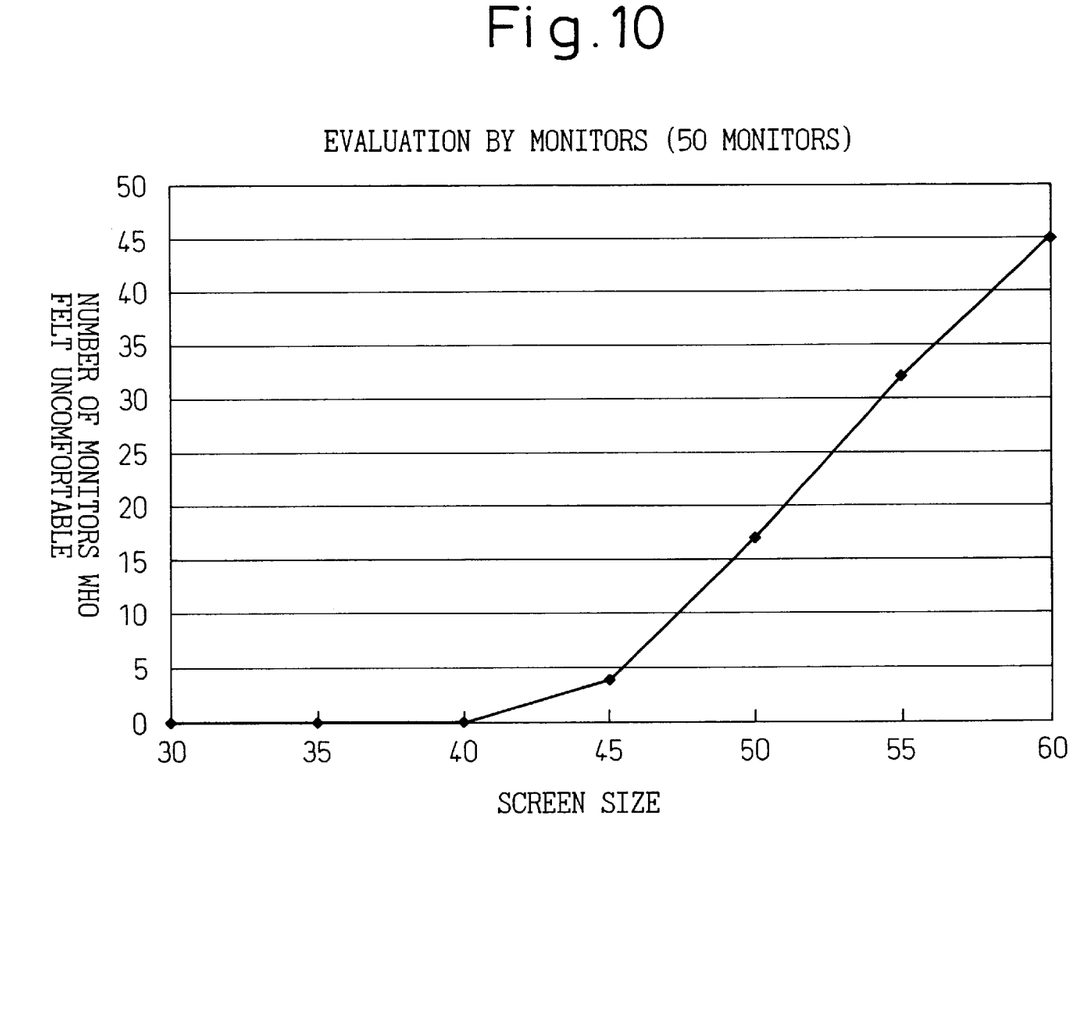
FIG. 10 is a diagram showing the relation between a screen size of a hologram screen and the number of monitors in the third embodiment.

The image light was irradiated to onto each hologram screen in the same way as in embodiment 1 to display the image. Fifty monitors observed this image and evaluated the image quality. FIG. 10 shows the results.

The hologram screen size at which the monitors cared about the interference pattern was larger than a screen size of 40 inches. At this time, the interference pattern appears only at end portions of the screen but is not so noticeable.

Thereafter, the number of monitors that cared about the pattern increased, and as to the 60-in. screen, forty-five monitors (90%) out of fifty monitors answered that the interference pattern was worrying. It has thus been found that the interference pattern deteriorates image quality.

Therefore, hologram screens of 40-in. or more were constituted in such a fashion that the direction of the light-transmissible film giving the highest thermal shrinkage ratio was coincident with the axial direction of the screen, and were tested in the same way. As a result, no answer is given, to the effect that the interference pattern was worrying, for the 60-in. monitor.

It has thus been found that the application of the present invention is effective for large-scale hologram screens of 40-in. or more.

Embodiment 4

In this embodiment, image quality was tested in hologram screens having a light-transmissible film the thermal shrinkage ratio of which varied depending on direction.

A large number of hologram screens were prepared, and image light was irradiated to each screen in the same way as in the embodiment 1.

In consequence, each hologram element displayed the image, and a large number of monitors evaluated the image quality of the image.

Figure 11:
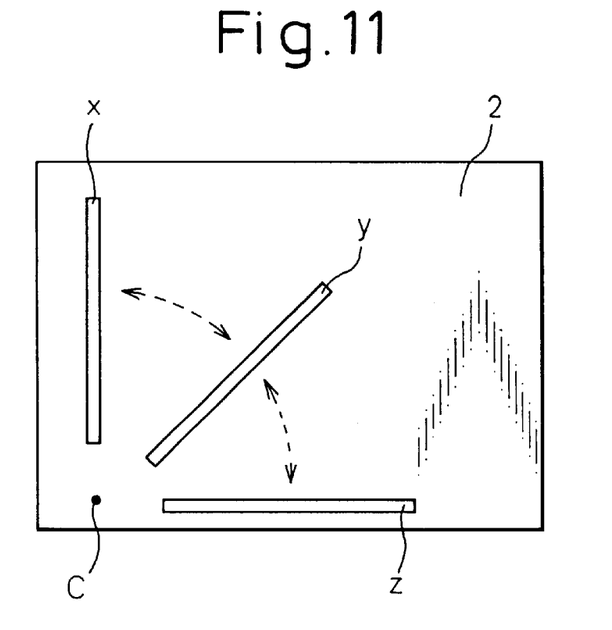
FIG. 11 is an explanatory view when fragments are sliced from a hologram screen in the fourth embodiment.

After the evaluation was completed, a center C was set to a lower left corner of each hologram screen 2, and fragments were cut off, with 5° gaps, into a fan shape with the center C being the center of the fan as shown in FIG. 11. The fragment in the longitudinal direction of the hologram screen is x, the fragment along the diagonal line at 45° is y and the fragment in the transverse direction is z. Incidentally, fragments having other angles were omitted from description.

The thermal shrinkage ratio of each fragment was determined from the shrinkage amount of the fragment.

As a result, it was found that the image having high image quality could be observed in the hologram screens in which the difference of the thermal shrinkage ratio between all the fragments was within 3%, but good image quality could not be obtained in other hologram screens because interference fringes occur.

What is claimed is:

1. An image display apparatus comprising:
   a hologram screen for receiving image light irradiated from an illumination device to thereby reproduce an image on said hologram screen, wherein:
      said hologram screen is formed by bonding a hologram element to light-transmissible films;
      said image light includes R, G, and B components, and wherein the R and the B components include P polarized light, and wherein the G component includes a combination of P polarized light and S polarized light; and
      one of said light-transmissible films positioned on an irradiation side of said image light relative to said hologram screen has an angle of deviation of not greater than 45 degrees, said angle of deviation being between a direction of said one of said light-transmissible films having a highest thermal shrinkage ratio and an axial direction of said hologram screen.

2. An image display apparatus according to claim 1, wherein said angle of deviation between said direction in said light-transmissible film giving said highest thermal shrinkage ratio and said axial direction in said hologram screen is within 15 degrees.

3. An image display apparatus according to claim 1, wherein the direction in said light-transmissible film giving the highest thermal shrinkage ratio and the axial direction in said hologram screen coincide with each other.

4. An image display apparatus according to claim 1, wherein an optimum angle of incidence of said image light to a center of said hologram screen is 35 degrees.

5. An image display apparatus including a hologram screen formed by bonding a hologram element to light-transmissible films and an illumination device for irradiating image light to said hologram screen and reproducing an image on said hologram screen, wherein:
   said image light includes R, G, and B components, and wherein the R and the B components include P polarized light, and the G component includes a combination of P polarized light and S polarized light; and
   said light-transmissible film positioned on the irradiation side of said image light relative to said hologram element is so constituted as not to generate birefringence.

6. An image display apparatus according to claim 5, wherein said light-transmissible film comprises a resin film.

7. An image display apparatus according to claim 5, wherein said light-transmissible film positioned on the irradiation side of said image light relative to said hologram element comprises a polyethylene terephthalate film.

8. An image display apparatus according to claim 5, wherein a plurality of said hologram elements are bonded through light-transmissible films.

9. An image display apparatus according to claim 5, wherein a diagonal length of said hologram element is at least 104 cm.

10. An image display apparatus according to claim 5, wherein said hologram element is either of a transmission type or a reflection type.

11. An image display apparatus according to claim 5, wherein an angle of incidence of said image light to the center of said hologram screen is 20 to 50 degrees.

12. An image display apparatus according to claim 5, wherein a visible ray transmission factor of said light-transmissible film is at least 10%.

13. An image display apparatus according to claim 5, wherein an optimum angle of incidence of said image light to a center of said hologram screen is 35 degrees.

14. An image display apparatus including a hologram screen formed by bonding a hologram element to light-transmissible films and an illumination device for irradiating image light to said hologram screen and reproducing an image on said hologram screen, wherein:
   said image light includes R, G, and B components, and wherein the R and the B components include P polarized light, and wherein the G component includes a combination of P polarized light and S polarized light; and
   said light-transmissible film positioned on the irradiation side of said image light relative to said hologram element has a difference of not greater than 0.3% between a direction giving the highest thermal shrinkage ratio and a direction giving the lowest thermal shrinkage ratio.

15. An image display apparatus according to claim 1, wherein said light-transmissible film positioned on the irradiation side of said image light relative to said hologram element comprises a polyethylene terephthalate film.

16. An image display apparatus according to claim 1, wherein a plurality of said hologram elements are bonded through light-transmissible films.

17. An image display apparatus according to claim 1, wherein a diagonal length of said hologram element is at least 104 cm.

18. An image display apparatus according to claim 1, wherein said hologram element is either of a transmission type or a reflection type.

19. An image display apparatus according to claim 1, wherein an angle of incidence of said image light to the center of said hologram screen is 20 to 50 degrees.

20. An image display apparatus according to claim 1, wherein a visible ray transmission factor of said light-transmissible film is at least 10%.

21. An image display apparatus according to claim 14, wherein said light-transmissible film positioned on the irradiation side of said image light relative to said hologram element comprises a polyethylene terephthalate film.

22. An image display apparatus according to claim 14, wherein a plurality of said hologram elements are bonded through light-transmissible films.

23. An image display apparatus according to, wherein at least one chromatic component among RGB (red, green and blue) components in said image light irradiated from said illumination device is linearly polarized light.

24. An image display apparatus according to claim 14, wherein a diagonal length of said hologram element is at least 104 cm.

25. An image display apparatus according to claim 14, wherein said hologram element is either of a transmission type or a reflection type.

26. An image display apparatus according to claim 14, wherein an angle of incidence of said image light to the center of said hologram screen is 20 to 50 degrees.

27. An image display apparatus according to claim 14, wherein a visible ray transmission factor of said light-transmissible film is at least 10%.

28. An image display apparatus according to claim 14, wherein an optimum angle of incidence of said image light to a center of said hologram screen is 35 degrees.

* * * * *